Figure 1:
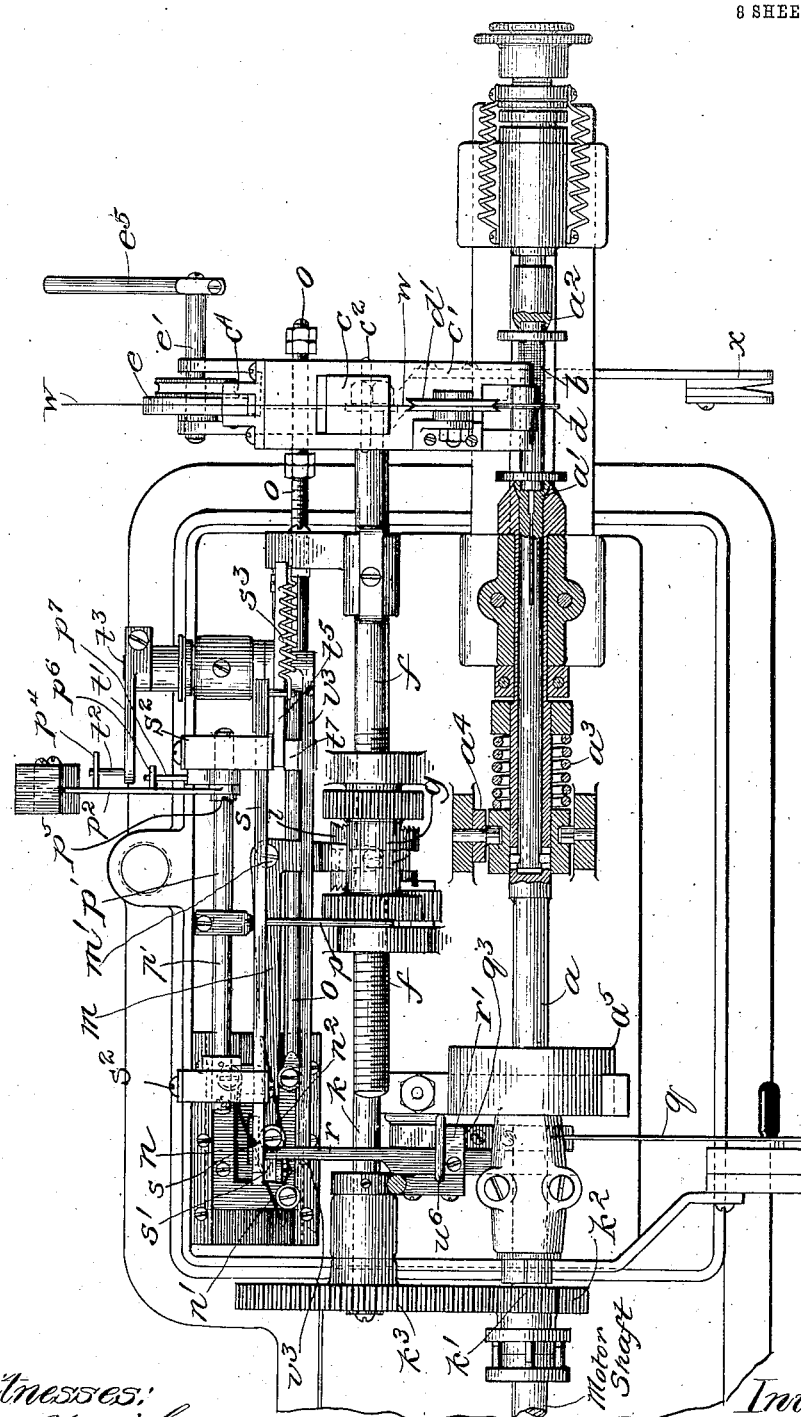

No. 890,244. PATENTED JUNE 9, 1908.
F. H. LOVERIDGE.
MAGNET WINDING MACHINE.
APPLICATION FILED APR. 17, 1903.

8 SHEETS—SHEET 1.

Witnesses:

Inventor:
Frederick H. Loveridge,
By Barton & Tanner
Attorneys.

No. 890,244. PATENTED JUNE 9, 1908.
F. H. LOVERIDGE.
MAGNET WINDING MACHINE.
APPLICATION FILED APR. 17, 1903.

8 SHEETS—SHEET 4.

Witnesses:

Inventor:
Frederick H. Loveridge,
By Barton & Tanner
Attorneys

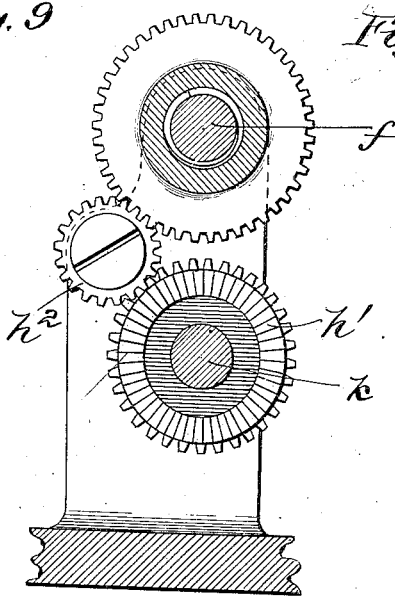
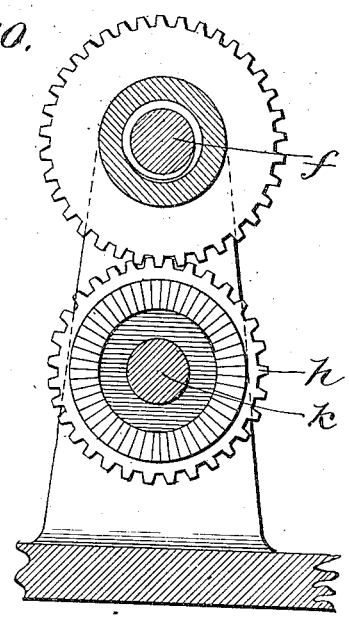
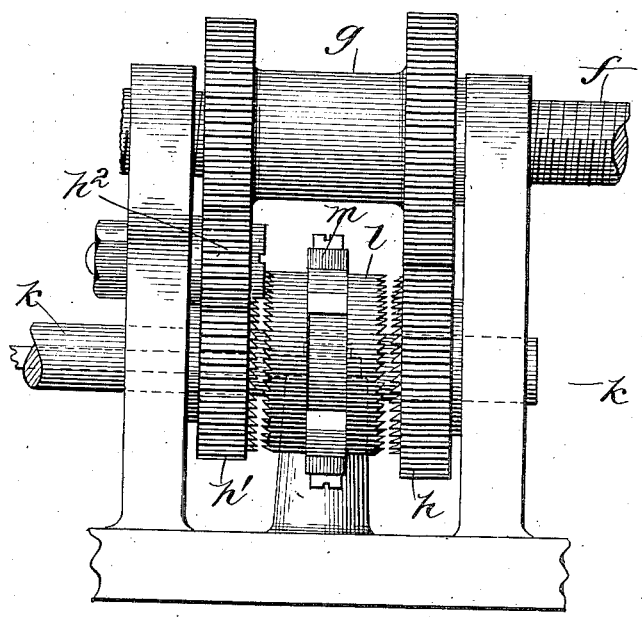

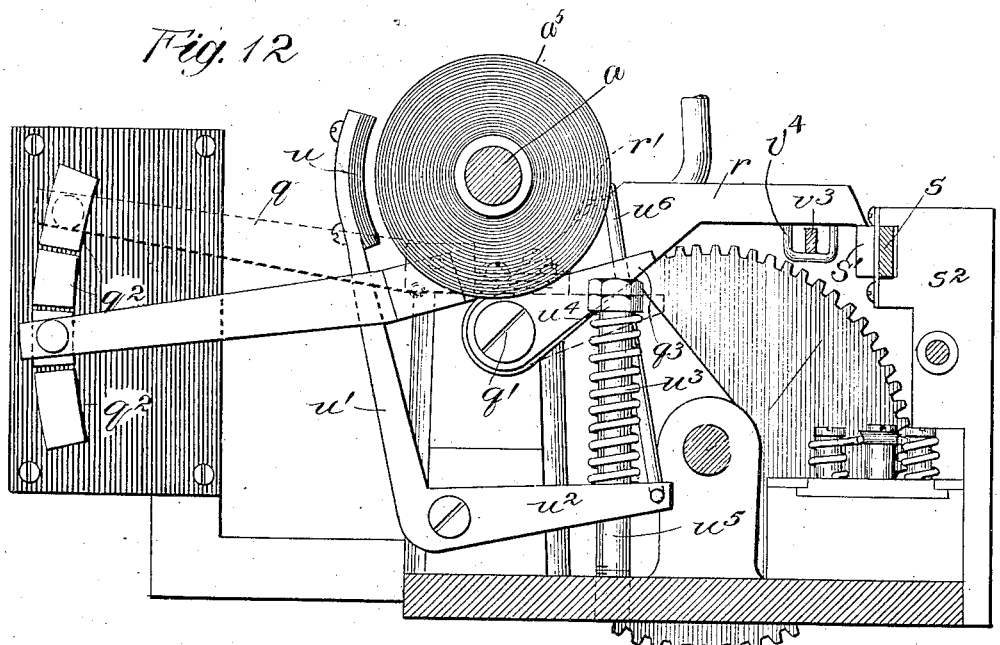
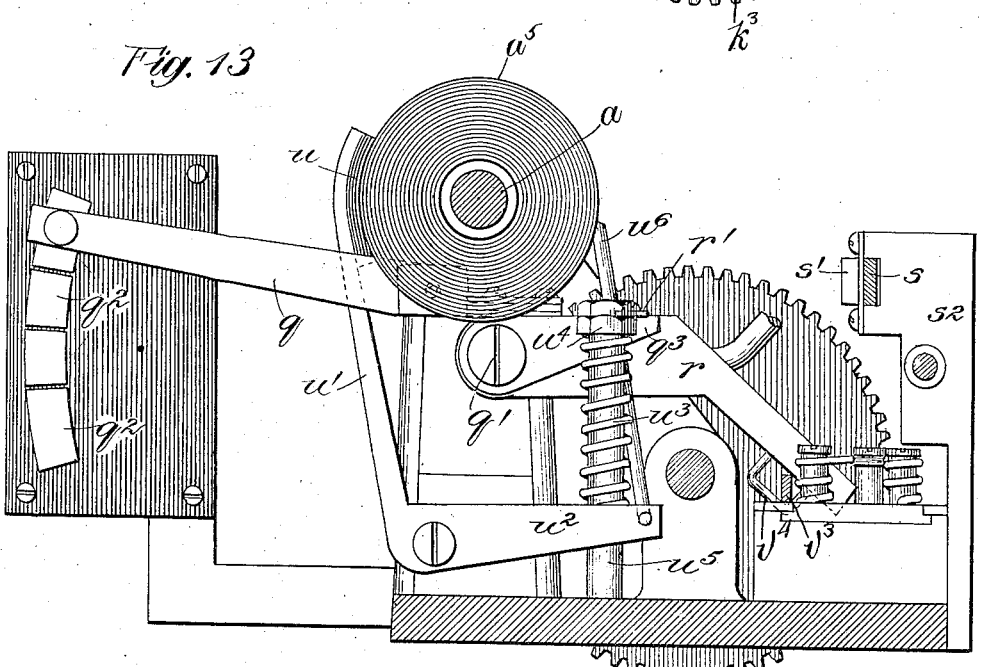

No. 890,244.
PATENTED JUNE 9, 1908.
F. H. LOVERIDGE.
MAGNET WINDING MACHINE.
APPLICATION FILED APR. 17, 1903.
8 SHEETS—SHEET 8.
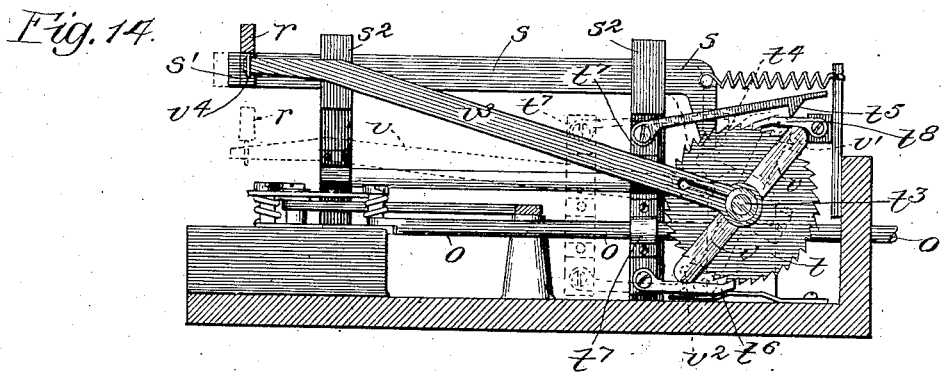
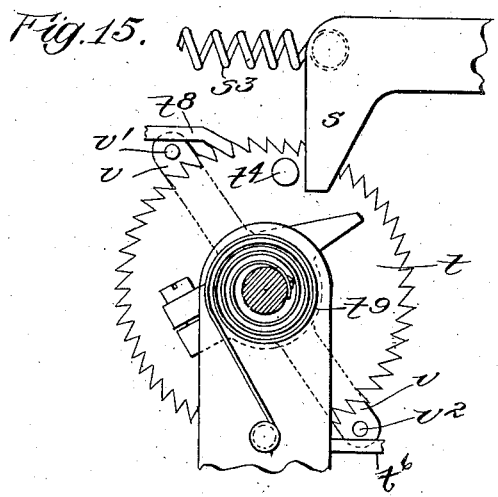
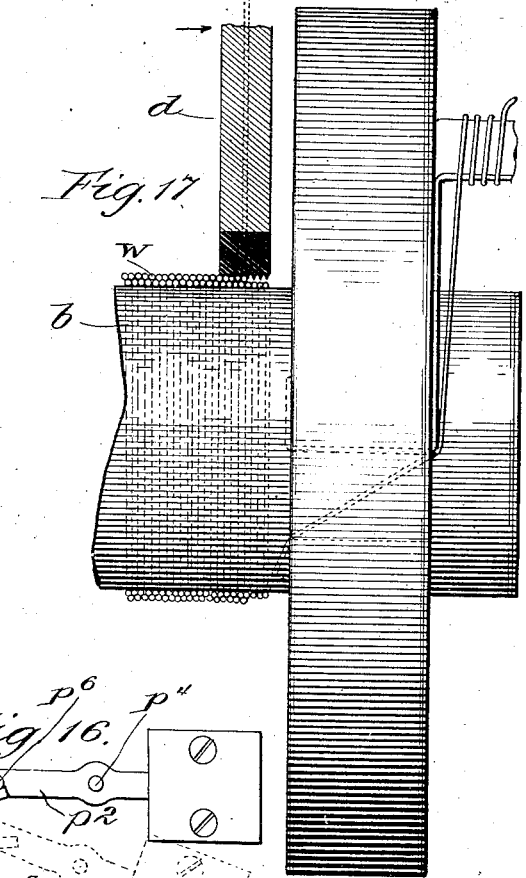
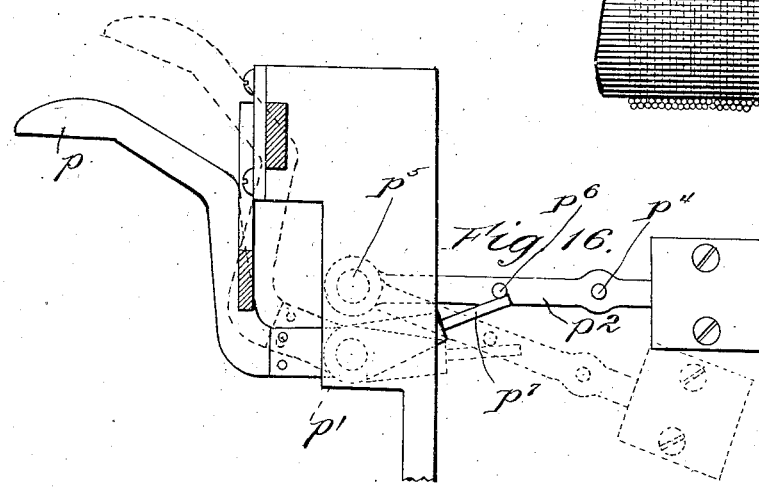
Witnesses:
Inventor:
Frederick H. Loveridge,
By Barton & Tanner
Attorneys.

UNITED STATES PATENT OFFICE.

FREDERICK H. LOVERIDGE, OF CHICAGO, ILLINOIS, ASSIGNOR TO WESTERN ELECTRIC COMPANY, OF CHICAGO, ILLINOIS, A CORPORATION OF ILLINOIS.

MAGNET-WINDING MACHINE.

No. 890,244.   Specification of Letters Patent.   Patented June 9, 1908.

Application filed April 17, 1903. Serial No. 153,020.

*To all whom it may concern:*

Be it known that I, FREDERICK H. LOVERIDGE, a citizen of the United States, residing at Chicago, in the county of Cook and State of Illinois, have invented a certain new and useful Improvement in Magnet-Winding Machines, of which the following is a full, clear, concise, and exact description.

My invention relates to a machine for winding insulated wire upon magnet spools.

The machine which forms the subject-matter of this application is capable of automatically winding any required number of turns of fine wire upon a magnet spool without attention from the operator beyond the mere placing of the magnet spool in position, attaching the wire and starting the machine, and this winding will be laid regularly and compactly, without crossing over of neighboring convolutions, without requiring paper insulation between layers, and without any danger of breaking the wire, stripping the very light silk covering from it, or otherwise impairing the efficiency of the magnet.

A further most important consideration is that the machine may be run at a very high speed, 4000 revolutions per minute of the spool being a good working speed, as I have found in practice. An operator who by hand could wind but sixty spools a day can with a single machine wind nearly three times that number, and furthermore, several such machines may be run by a single operator.

In the machine of my invention is provided a guiding roller for applying the wire to the rotating spool, said roller being arranged to press continuously against the spool and rotate therewith, while being reciprocated to and fro along the spool by suitable traverse mechanism. The rim of the guiding roller is made of hard rubber or other substance having similar qualities, and a groove is cut in the central portion of the periphery thereof through which the wire is led to the spool, and the roller is preferably of sufficient width so that on one side or the other of the groove, according to the direction of travel along the spool, it will press firmly against one or more of the convolutions last laid, to hold them in position and prevent "spooling up," or crossing over of the wire. The travel of the guiding roller along the spool is, of course, maintained at a fixed ratio to the speed of rotation of the spool, this ratio being dependent upon the size of the wire being wound. In other words, during one revolution of the spool, the guiding roller will move along a distance equal to or slightly greater than the diameter of the wire being wound thereon.

In the preferred form of my invention, the guiding roller has additional grooves in its periphery similar to and on either side of the central groove, to fit the convolutions last laid. I have successfully used a guiding roller provided with a rim of hard rubber, in the edge of which seven V-shaped grooves are cut, the distance between the grooves being proportioned to the diameter of the wire to be wound. The use of such a grooved guiding roller as I have described is impracticable if the periphery or grooved engaging surface is of metal such as steel, because if the edges of the grooves are sharp enough to make the roller follow properly the convolutions of wire, the insulating covering of the wire would be cut. I have, however, discovered that a roller having a hard rubber rim will follow perfectly the convolutions of the wire without in any way injuring the insulating covering thereof. The body of the roller, however, should be made of steel to obtain sufficient strength.

One of the difficulties to be overcome is that of winding wire clear into the corner against the head of the spool and starting back again without undue confusion and crossing over of the convolutions at the corner. The guiding roller is of such width that the central groove through which the wire is led onto the spool cannot guide the wire clear into the corner. I have overcome this difficulty by winding the first two layers or so only so far into the corner as the central groove of the roller will take the wire, the roller being caused to begin its journey in the reverse direction the instant it reaches the corner. Later, after the initial layers have been wound on the spool, and there are thus left little depressions or spaces in the corners where the wire has not been carried, the guiding roller may be arranged to stop momentarily at each corner before it starts the return journey, thus allowing the wire to run free below the roller during say six or seven revolutions of the spool, so as to wind down into these spaces.

Means should be provided for preventing the retrogression of the guiding roller toward the axis of the spool after it is raised by the successively-increasing layers of wire upon the spool. The preferred mechanism for doing this consists of a rotatable cam mounted upon the traversing carriage and acting upon the arm which carries the guide roller, with means, such as a weighted cord and pulley, for advancing the cam as the arm is raised, to prevent the retrogression of said arm.

Other features of my invention consist in the particular mechanism for quickly reversing the travel of the carriage as it reaches the end of its journey in either direction, and the mechanism for stopping the machine after a predetermined number of layers of wire have been wound upon the magnet spool.

A further feature of my invention consists in the improved mechanism which I have devised for placing the wire under tension as it is unwound from the reel onto the magnet spool, together with a braking device for said reel controlled through the agency of the wire as it is being unwound therefrom.

In the accompanying drawings, I have illustrated a machine embodying my invention, and this machine I shall now proceed to describe in detail.

Figure 2:
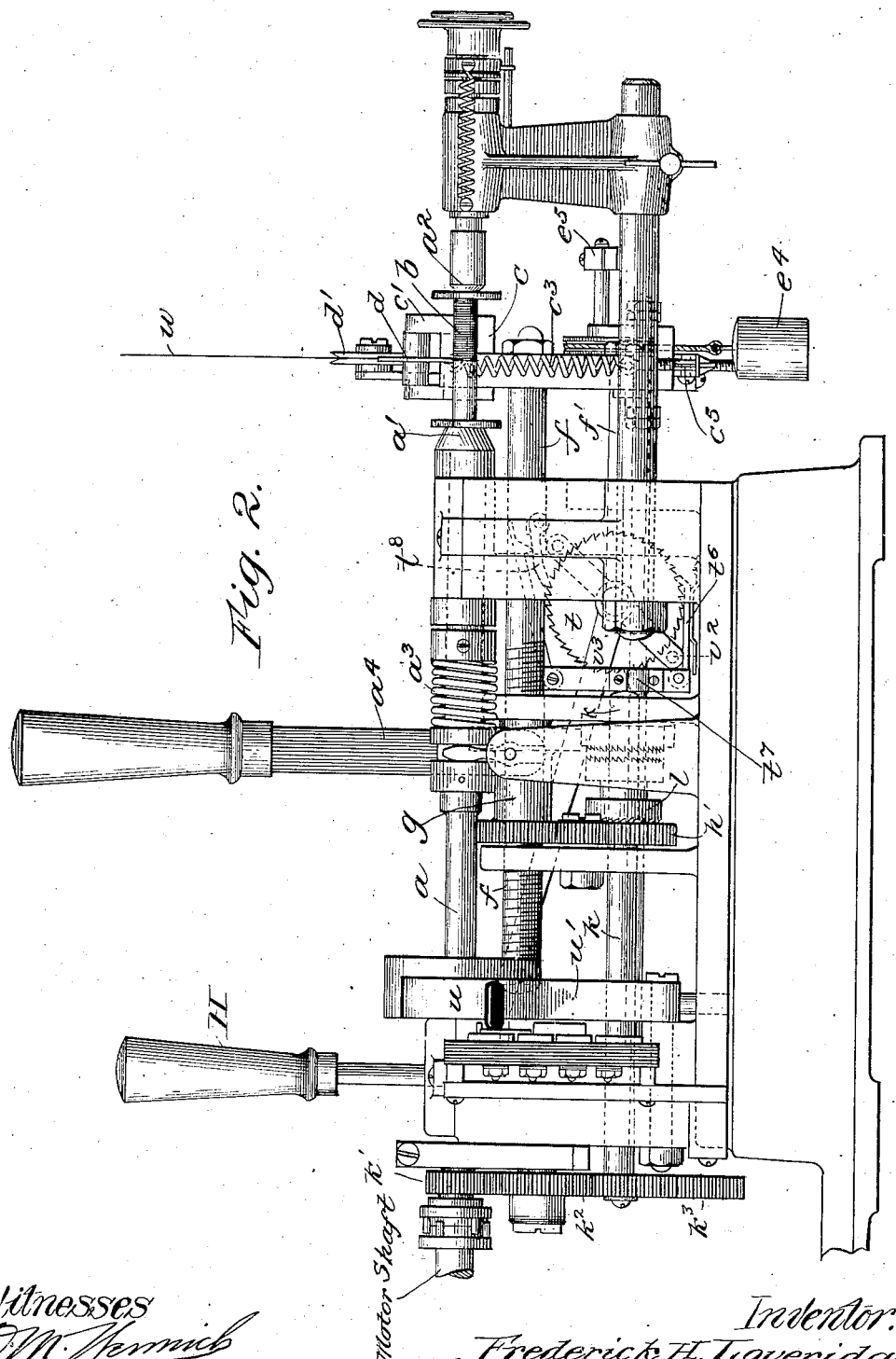
Figure 3:
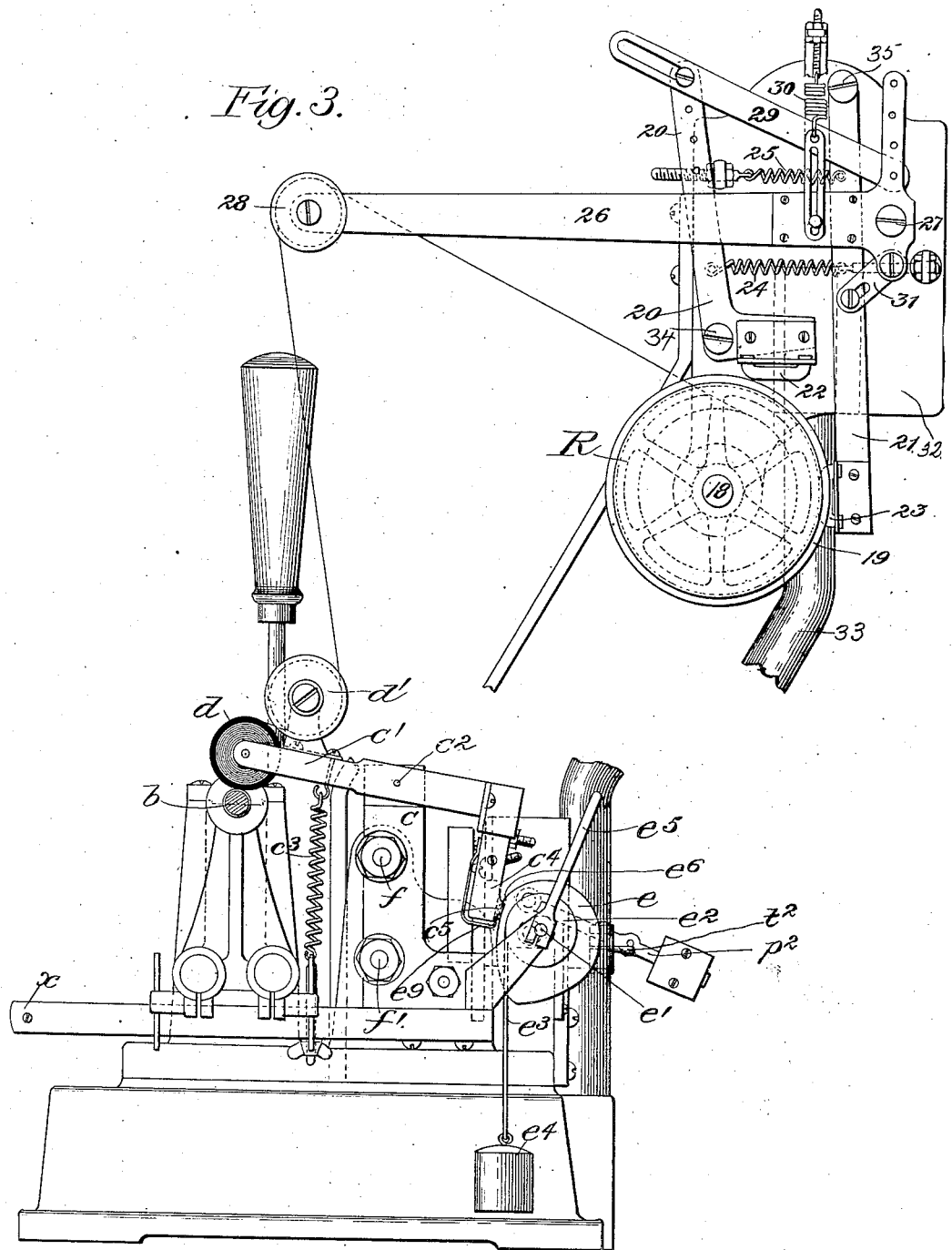
Figure 4:
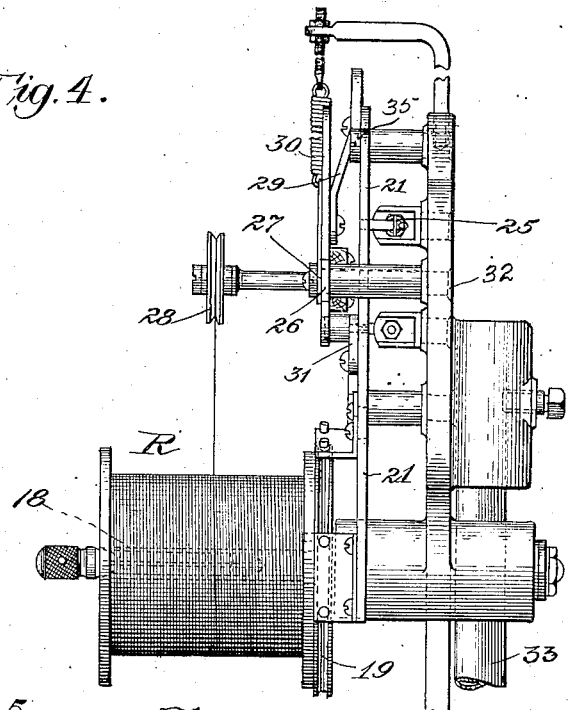
Figure 5:
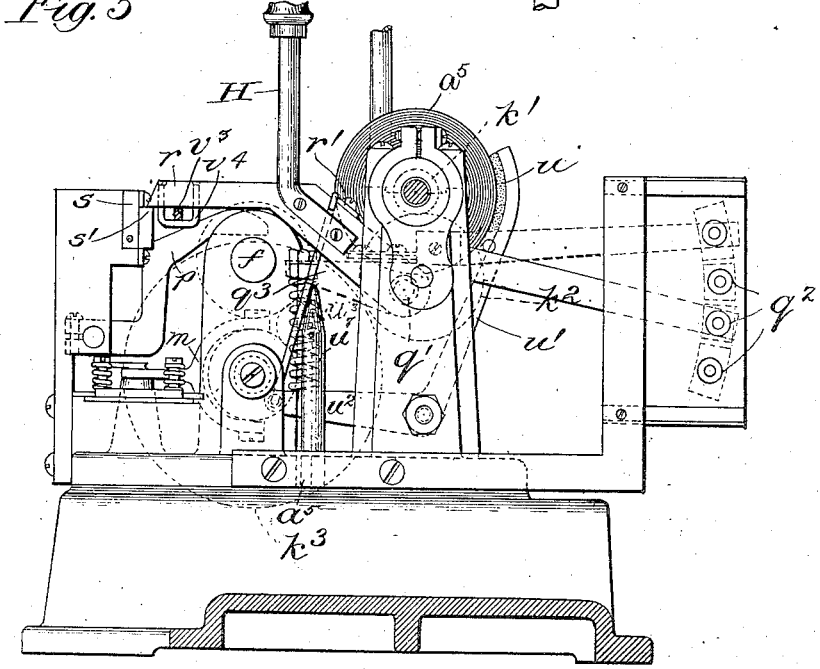

Figure 1 is a plan view of the winding machine; Fig. 2 is a front elevation thereof; Fig. 3 is a right end elevation of the machine, showing also the tension device and braking mechanism of the reel from which the wire is unwound; Fig. 4 is an edge view of the tension and brake mechanism of the reel; Fig. 5 is a left end elevation of the winding machine. In Figs. 3 and 5 some of the distant parts are omitted for clearness, and in Fig. 5 the gear-wheels are indicated simply by dotted lines. Figs. 6, 7, 8, 9, 10 and 11 are detail views of the reversible mechanism for reciprocating the guide carriage; Figs. 12 and 13 are detail views in sectional elevation, illustrating the automatic mechanism for stopping the machine and cutting off current from the electric motor when the predetermined number of layers have been wound upon the magnet spool; Figs. 14 and 15 are other details of mechanism actuated by the traverse of the carriage to control the stopping mechanism shown in Figs. 12 and 13; Fig. 16 is a detail view showing a portion of the mechanism which controls the "lost motion" of the reversing gear; and Fig. 17 is an enlarged detail view showing the guiding roller bearing upon the magnet spool being wound.

The same letters of reference are used to designate the same parts wherever they are shown.

The machine illustrated is adapted to be driven by an electric motor coupled to the main shaft $a$, as indicated in Fig. 1. The magnet spool $b$ to be wound is held by a chuck $a'$ provided at one end of said driving shaft, the other end of said spool being free to rotate in the dead center $a^2$. The jaws of the chuck are actuated through the agency of a strong compression spring $a^3$ and may be opened by moving the chuck lever $a^4$ in a direction to counteract said spring.

The wire $w$ to be wound upon the magnet spool is led from the reel R through suitable tension and braking mechanism hereafter to be described, to an idler sheave $d'$, and through the central groove of the guiding roller $d$ onto the magnet spool. Said guide roller $d$ and idler sheave $d'$ are both mounted upon the forward end of the rocking arm $c'$, which is pivoted at $c^2$ to the traverse carriage $c$ and forms a part thereof. A strong spring $c^3$ acting upon the arm $c'$ causes the guiding roller to be pressed firmly down upon the spool; but as the arm carrying said guiding roller is gradually raised due to the increasing diameter of the cop, a bell crank extension $c^4$ of said arm is engaged by a cam $e$ in such a manner as to prevent the arm from returning below the point to which it has been raised. The cam $e$ is mounted in the rear portion of the framework of the traverse carriage $c$, opposite the downwardly-projecting bell crank extension $c^4$, and is arranged to press against lugs $c^5$ $c^5$ on the face of said extension. The axle $e'$ of the cam is arranged to be rotated to advance the cam by means of a wheel $e^2$ which carries a cord $e^3$ passing over the same, with a weight $e^4$ attached to the end of said cord. A handle $e^5$ is provided by which the cam may be either returned to its normal position or advanced far enough to raise the guiding roller clear away from the spool, as when the spool is put into or taken out of the machine.

A shoulder $e^6$ is provided upon the edge of the cam at a point to be engaged by the lugs $c^5$ upon the face of the bell crank arm $c^4$ when said arm $c'$ is lowered clear down, as in applying the first two or three layers of wire to the magnet spool. This shoulder $e^6$ upon the cam acts as a catch to prevent the advance of the cam until the first two or three layers of wire have been wound upon the magnet spool, whereupon the face of the bell crank extension $c^4$ will be moved out far enough to no longer engage with said catch or shoulder, so that the cam may thereafter be advanced by the weight to perform its function of preventing the retrogression of the guiding roller as said roller is raised. I have found it desirable to let the guiding roller press continuously against the spool, irrespective of slight irregularities, while the first two or three layers are being wound, after which the roller should not be allowed to return inwardly toward the axis of the spool after it is moved outward to an extent proportional to the greatest diameter of the spool at any point over which it travels. A spring $e^6$ carried by the bell crank arm $c^4$ is arranged to press against the face of the cam to put a slight drag upon it, so that the cam will not be too quickly responsive to very slight vibrations of the rocking arm. The cam mechanism which I have described for preventing the inward movement of the guiding roller has a decided advantage over any such mechanism as a pawl and ratchet, for the reason that the cam when once brought into operation is continuously acting and will serve to hold the roller at any distance from the axis of the spool, instead of merely moving out step by step and being incapable of any adjustment other than the definite one determined by the pawl and ratchet. Other mechanism beside the cam may be employed, which will be continuously-acting, but in practice I found the cam to be very satisfactory.

As shown in Fig. 17, the guiding roller which I prefer to employ has seven grooves in its periphery, adapted to fit the convolutions of wire upon the spool, the wire being applied through the central groove. Grooves on either side of the center, according to the direction of travel along the spool, press against the three convolutions last laid, to hold them in position and prevent "spooling up" of the wire. The grooved rim of the roller should be made of some substance such as hard rubber, which will not cut the insulating covering of the wire.

The carriage $c$ carrying the guiding roller is mounted upon the ends of two rods $f f'$, which are arranged to slide to and fro in bearings supported by the bed-plate of the machine. The upper rod $f$ is threaded and serves as a feed screw. A feed nut $g$, provided with a gear wheel on each end, is mounted to rotate between suitable standards upon the bed of the machine, so that as the feed nut is rotated the traverse carriage $c$ will be moved in one direction or the other by the threaded feed rod $f$, dependent upon the direction of rotation of the feed nut $g$. The feed nut is arranged to be driven by either one of two clutch gears $h h'$, the gear $h$ meshing directly with the gear wheel upon one end of the feed nut, and the gear $h'$ being geared to the other end of the feed nut through an idler $h^2$. The clutch gears $h h'$ are mounted to rotate freely upon a shaft $k$, which is driven from the main shaft $a$ of the machine through suitable gear wheels $k' k^2 k^3$. A clutch $l$ is splined to rotate with the shaft $k$ between the clutch gears $h$ and $h'$, and is capable of sliding longitudinally of said shaft to engage one of said clutch gears and impart the rotation of said shaft thereto. The clutch $l$ is arranged to be moved in one direction or the other by a reversing lever $m$ pivoted at $m'$ to the bed-plate of the machine. The reversing lever is arranged to be thrown automatically first to one side and then to the other during the operation of the machine, to cause the traverse carriage to move to and fro and carry the guiding roller back and forth along the magnet spool which is being wound.

Figure 6:
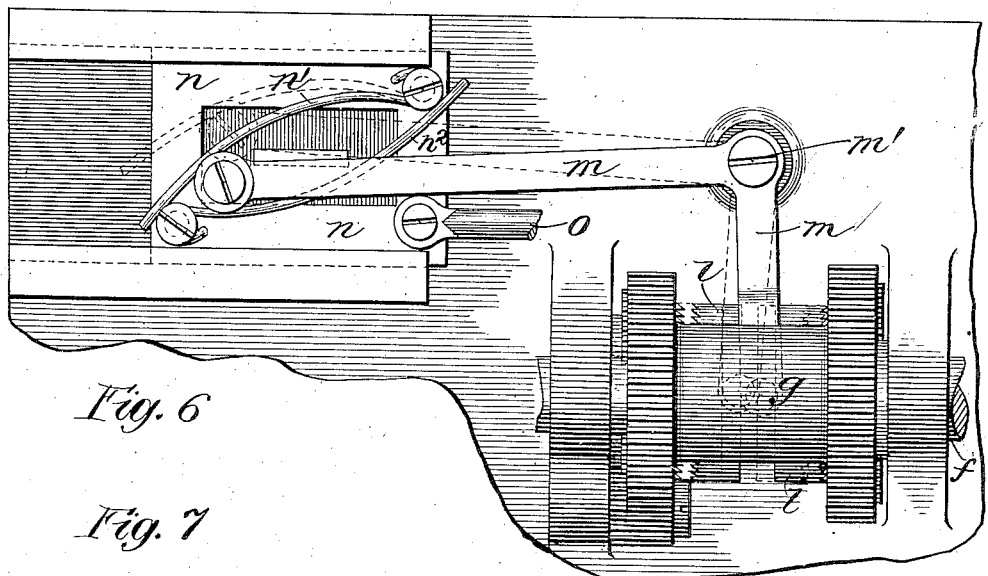
Figure 7:
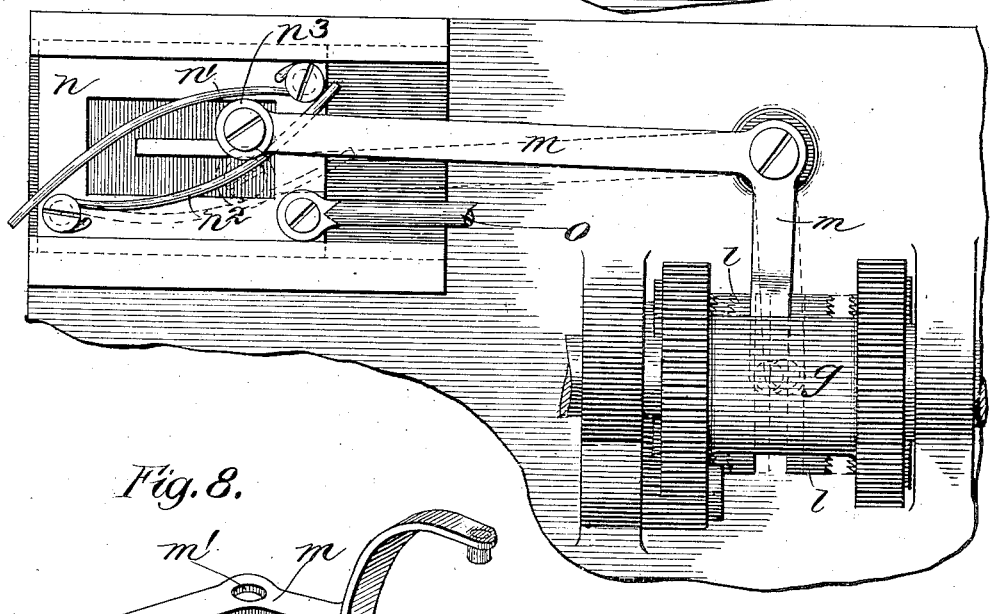
Figure 8:
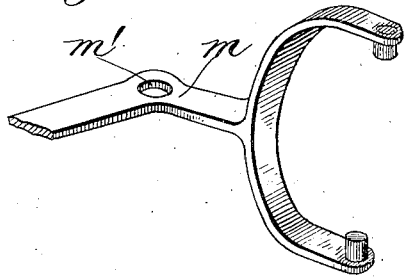

The mechanism for operating the reversing lever will be understood by reference to Figs. 1, 6 and 7. A cam plate $n$, having a groove in which a pin or block carried by the end of the reversing lever travels, is arranged to be moved to and fro in the bed-plate of the machine by a rod $o$ which is in turn moved by the carriage $c$. Said rod $o$ passes through an opening in the carriage $c$ and is provided with stop nuts on either side of said carriage, so that as the carriage moves in one direction it will engage one of the stop nuts and so move the rod longitudinally in the same direction. Then when the movement of the carriage is reversed (which reversal is brought about as I shall presently describe by the movement of said rod) the carriage engages the other stop nut and so carries the rod along with it in the other direction.

The cam plate $n$ is provided with two longitudinal grooves parallel to one another, with cross grooves at the end connecting them, thus providing a quadrilateral path in which the pin or block carried by the end of the reversing lever may travel. Two springs $n' n^2$ are provided upon the sliding cam plate, as shown most clearly in Figs. 6 and 7, to throw the sliding block carried by the reversing lever through the cross grooves as the cam plate reaches the end of its journey in either direction. Said springs may be arranged to bear upon a grooved roller $n^3$ carried by the end of the reversing lever $m$ to avoid friction.

The operation of the reversing mechanism will be easily understood by reference to Figs 6 and 7. Assuming the parts in the position shown in Fig. 6, the clutch will be thrown in position such that the guiding carriage with the rod $o$ and cam plate connected thereto will be moved to the left. As the cam plate moves, the roller carried by the end of the reversing lever slides in the lower one of the longitudinal grooves, and as it nears the end of said groove, the spring $n^2$ bears with increasing force upon the roller $n^3$. When the cam plate reaches the extreme left-hand end of its journey, the roller $n^3$ carried by the end of the reversing lever is brought opposite the cross groove leading to the upper longitudinal groove and the spring $n^2$ therefore throws the reversing lever over into the position shown in Fig. 7. The clutch being thus thrown over to engage the other gear wheel, the feed nut $g$ is driven in the opposite direction and causes the carriage to make its return journey. At the end of this journey, the reversing lever is again thrown into the lower groove by the spring $n'$, as shown in Fig. 6. The carriage is thus caused to travel to and fro to move the guide roller along the spool as long as the machine continues in operation. The gearing is, of course, proportioned so that the guiding roller will travel through a distance substantially equal to the thickness of the wire being laid during each revolution of the spool.

The feed nut $q$ is mounted loosely between its abutting end pieces or standards, so that there will be a certain and definite amount of "lost motion." That is to say, the carriage will be stationary while the feed nut is traveling along the feed screw from one standard to the other, before the feed screw is actually moved in the reverse direction. To prevent this lost motion, however, during the first two or three reversals of the carriage, I have provided a shim $p$, which is normally dropped in between the feed nut and one of the abutting end pieces, so that while this shim is in place, the feed nut will have no lost motion, and an immediate reverse movement of the feed screw and carriage will result from a reversal of rotation of the feed nut. The shim $p$ is carried by a rocking shaft $p'$. A weighted arm $p^2$ tends to rock the shaft $p'$ in a direction to move the shim out of engagement with the feed nut, but during the first few journeys of the carriage, this weighted arm is held up by a pin $t^2$ carried by an arm $t'$ and engaging a pin $p^4$ carried by the arm $p^2$. Said arm $t'$ is carried by a shaft $t^3$ that is rotated step-by-step by means of a ratchet wheel $t$, the rotation of said ratchet wheel being caused by pawls $t^5$ $t^6$ which engage said wheel as the carriage is reciprocated. The arm $p^2$ is mounted upon a stub shaft $p^5$ and carries a pin $p^6$ adapted to engage a finger $p^7$ carried by the shaft $p'$ to operate the shim when the pin $t^2$ is removed.

Referring now more particularly to Figs. 1, 5, 12, 13, 14 and 15, I shall proceed to describe the controlling mechanism by which the machine is automatically stopped when the predetermined number of layers of wire have been wound upon the magnet spool. The motor driving the machine is controlled by a switch arm $q$ pivoted at $q'$ so as to pass over the contacts $q^2$ $q^2$ of a rheostat. When the switch arm is in its upper position, as shown in Figs. 5 and 13, for example, the current is cut off from the motor, and the motor may be started and the speed gradually increased by moving the switch arm downward across the contact studs. The handle H connected with the arm $r$ is provided to lift said arm until the same is caught by stop $s'$, in order to start the machine. The switch arm is arranged to be automatically returned to its normal upper position from any point by the falling of a stop lever $r$, which is provided with a lug $r'$ adapted to engage a rearward extension $q^3$ of said switch arm. During the operation of the machine the stop lever is held up free of the switch arm by a lug or stop $s'$ carried by a rod $s$ arranged to slide in supporting standards $s^2$ $s^2$. This sliding stop rod $s$ is yieldingly maintained by a spring $s^3$ shown in Figs. 1, 14 and 15, in position to interpose the stop $s'$ beneath the end of the stop lever $r$ and so to hold said stop lever up in the position shown in Figs. 5 and 12. When the guide carriage has made the predetermined number of journeys, a pin $t^4$ carried by the ratchet wheel $t$, which is advanced step by step by the reciprocation of the carriage, strikes the end of said stop slide $s$ and moves the same against the tension of the spring $s^3$—that is, to the left as seen in Figs. 1 and 14—until the stop $s'$ is moved from under the end of the stop lever, permitting the same to fall to the position shown in Fig. 13, whereby the lug $r'$ of said stop lever engaging the rearward extension $q^3$ of the switch arm returns said arm to its upper position, thus stopping the motor.

The falling of the stop lever is also caused to apply a brake $u$ to the brake wheel $a^5$ carried by the main shaft $a$ of the machine. The brake $u$ is carried by a bell-crank brake lever $u'$, the lower horizontal arm $u^2$ whereof is engaged by a compression spring $u^3$ confined between the upper edge of said arm $u^2$ and a nut $u^4$ screwed upon the upper end of a pin or standard $u^5$ passing down through the convolutions of said spring and fastened in the bed-plate of the machine. A stop $u^7$ is provided for limiting the downward movement of the arm $r$. The arm $u^2$ of the brake lever carries a hook $u^6$ which is engaged with the stop lever $r$, whereby when said stop lever is raised the brake is rocked against the tension of spring $u^3$ to lift the brake shoe $u$ from the wheel $a^5$. A strong downward pull is exerted upon the stop lever, so that when released it will have sufficient force in falling to return the switch arm $q$ to its "off" position.

The rotation of the ratchet wheel $t$ is brought about in the reciprocation of the guide carriage by pawls $t^5$ $t^6$ carried upon an upright $t^7$ which is fixed to the reciprocating rod $o$, said rod being moved, as before described, by the carriage $c$. When the rod moves to the right as seen in Fig. 14, the lower pawl $t^6$ will engage the ratchet to advance the same in a contra-clockwise direction, this rotation being opposed by a coiled spring $t^9$. A retaining pawl $t^8$ normally prevents the return of the ratchet wheel by the spring. When the rod $o$ makes its journey to the left, the upright $t$ is also carried to the left and draws the pawl $t^5$ with it, said pawl sliding down from the top of retaining pawl $t^8$ and into engagement with the teeth of the ratchet wheel, which is thus advanced another step. The pawls $t^5$ and $t^6$ are arranged to engage the wheel during such portions of their journey that the ratchet wheel is only advanced one tooth at each traverse of the guide carriage.

A release arm $v$ is fixed upon the shaft whereon the ratchet wheel turns, and carries two pins $v'$ $v^2$ which are adapted, when the release arm is rocked, to raise the pawls $t^6$ $t^8$ from the ratchet wheel, thus permitting the latter to be set back by the spring $t^9$ to its starting position. To rock the release arm $v$, a release lever $v^3$ is provided, fixed upon the same shaft and extending diagonally upward to the end of the stop lever $r$, to which it is connected by a staple $v^4$ in a manner to permit the stop lever and release lever to move up and down together. When the stop lever falls upon the completion of the winding of a spool, the release lever is thus rocked to raise the pawls $t^6$ $t^8$ from the ratchet wheel, whereupon the spring $t^9$ draws said ratchet back to its normal position. The number of teeth on the ratchet of course determines the number of layers which will be wound upon the magnet spool before the machine is automatically stopped.

Referring now more particularly to Fig. 3, I shall describe the improved tension mechanism which governs the feeding of the wire from the reel R to the winding machine, said mechanism being provided with a frame or support 32 mounted upon an upright arm 33 secured to the bed plate of the machine. The reel from which the wire is to be unwound is fixed upon a rotatable spindle 18, which is provided with a grooved brake wheel 19. Two brake levers 20 21 pivoted at 34, 35 to lugs carried by said supporting frame 32 are arranged to act upon said brake wheel, being provided with suitable brake shoes 22 23, respectively. The brake lever 20 is actuated by a powerful spring 24, and when operated is adapted effectually to stop the rotation of the wheel. The other or regulating brake lever 21 is actuated by a spring 25, which is arranged to press it more lightly against the brake wheel under the control of lever mechanism which is operated through the agency of the wire being unwound. Both of said brake levers are arranged to be controlled by a tension arm 26 pivoted at 27 to a lug carried by the support 32 of said arm carrying a pulley 28 over which the wire from the reel is passed on its way to the winding machine. The tension arm has a wide range of movement under the pull of the wire, but is yieldingly held retracted in position to permit the application of the brakes. In addition to the tension of the brake springs exerted upon the tension arm in a direction to retract it, a retractile spring 30 is preferably provided for said tension arm. A link 29 connects the tension arm with the stopping brake lever 20, so that the initial movement of said tension arm under the pull of the wire will serve to disengage the brake shoe from the wheel, leaving the reel under the control of the regulating brake 21. A slotted link 31 connects the regulating brake lever with the tension arm, so that this brake will be raised very gradually as the arm is pulled over, after the stopping brake has already been raised by the initial movement of said arm. By means of the mechanism just described the wire is kept under substantially uniform tension as it is unwound, regardless of the speed. The initial movement of the tension arm under the pull of the wire lifts the stopping brake, and a further movement reduces the pressure of the regulating brake until the reel turns under just the required resistance. A greater speed of the wire will pull the tension arm over a little further, so reducing the pressure of the brake, and vice versa, to keep the tension on the wire uniform; and when the machine is stopped, the tension arm is instantly retracted, so that both brakes are applied to stop the rotation of the reel.

The operation of the machine is as follows: After a magnet spool has been placed in position between the chuck $a'$ and the dead center $a^2$, the end of the wire leading from the reel R and passing over pulleys 28 and $d'$ and around the guiding roller $d$ through the central groove thereof, is passed through a hole in the head of the magnet spool and wrapped around a terminal strip which is fastened to the outside of the spool. (See Fig. 17). The cam $e$ is then rotated by the handle $e^5$ until the shoulder $e^6$ is engaged by the projection $c^5$ on the face of the bell crank arm which carries the guiding roller, said roller being thus let down and pressed against the spool through the agency of spring $c^3$. The stop lever $r$ being manually lifted until the end is caught and held up by the stop $s'$ on slide $s$, the switch arm $q$ controlling the motor may be moved downward to start the machine. The machine may, of course, be stopped if desired by returning the switch arm to its "off" position, but this will very rarely be necessary. As the magnet spool is rotated, the wire $w$ will be wound regularly upon it, the portion of the periphery of the guiding roller being pressed upon the convolutions last laid to hold them in place.

The guide carriage is moved by the feed nut $g$ coöperating with the threaded feed rod $f$, so that the guiding roller is moved along the spool a distance approximately equal to or slightly greater than the diameter of the wire during each revolution of the spool. As the guiding roller reaches the corner formed by the head of the spool, the reversing lever $m$ is automatically thrown as before described, and the travel of the guide carriage is reversed, whereby a second layer is wound on the spool on top of that just previously laid. During the winding of the first few layers, the shim $p$ is held in place between the head of the feed nut and its standard, so that lost motion is prevented and the carriage caused to begin its return journey immediately when the guide roller reaches the corner of the magnet spool. But as the guide carriage is reciprocated the ratchet wheel $t$ is advanced step by step, and the arm $t'$ is gradually lowered, until the pin $t^2$ no longer supports the weighted arm $p^2$, and the shim $p$ is therefore raised. When this happens, there will be a definite lost motion between the feed nut $g$ and the standard against which it abuts, so that the guide carriage will be caused to stand still a moment at each reversal of its movement, during say six or seven revolutions of the spool. While the carriage is thus standing still the wire runs free below the guiding roller down into the corner of the spool and back again, as has been explained.

When the required number of layers have been wound upon the magnet spool, the ratchet wheel $t$ will have been rotated far enough to bring the pin $t^4$ into engagement with the end of the stop slide $s$, whereupon the stop $s'$ will be moved from under the end of the stop lever $r$, permitting the latter to fall and stop the machine, as before explained; the ratchet wheel also being released and set back to its starting position.

The cam $e$ may now be rotated by the handle $e^6$ to raise the guide roller from the magnet spool, after which the spool may be taken out of the machine and another substituted. Before taking out the completed spool, the wire may be broken, and the severed end leading to the reel fastened temporarily to the clip $x$.

Having thus described my invention, I claim:

1. In a spool winding machine, the combination with spool rotating mechanism, of a centrally grooved guiding roller for applying the wire to the spool, traverse mechanism for reciprocating said guiding roller, said mechanism being adapted to delay the reversal of the guiding roller at the limit of its traverse during a definite number of revolutions of the spool.

2. In a winding machine, the combination with spool-rotating mechanism, of a grooved guiding roller for applying the wire to the spool, a pivoted arm carrying said roller, a reciprocating carriage upon which said arm is mounted, a spring acting upon said arm to press the roller against the spool, said arm being raised by the engagement of the roller with the spool as the latter increases its diameter, a rotatable cam mounted upon the carriage, acting upon said arm, and means for advancing said cam as the arm is raised, to prevent retrogression of the roller.

3. In a magnet winding machine, the combination with spool-rotating mechanism, of a grooved guiding roller arranged to press against the rotating spool while applying the wire thereto, reversible traverse mechanism adapted to reciprocate the roller along the spool, said mechanism being arranged to delay the return travel of the guiding roller at the corners of the spool, mechanism adapted to prevent such delay during the winding of the initial layer, means for yieldingly pressing the guiding roller inward toward the axis of the spool, and retaining mechanism brought into action after the winding of the initial layer, adapted to hold said guiding roller against inward movement after it has been moved outward by the addition of successive layers to the spool.

4. The combination with spool-rotating mechanism, of a guide for applying the wire to the spool, a guide carriage, reversible driving mechanism for reciprocating said guide carriage, a reversing lever controlling said mechanism, a relatively-movable cam plate and roller connected with said reversing lever to operate the same, said cam plate having two longitudinal grooves and connecting cross grooves, providing a quadrilateral path for the roller arranged to travel therein, a spring arranged to throw the roller, as it reaches the end of each longitudinal groove through the cross groove, whereby the reversing lever is actuated, and means for reciprocating the cam plate relatively to the roller in the reciprocation of the guide carriage.

5. A tension device for winding machines, comprising a reel from which the wire is unwound, a tension arm controlled by the wire being unwound, said tension arm being adapted to be swung on its pivot under the pull of the wire, a stopping brake for the reel made operative by said tension arm in its position of rest, and a regulating brake for said reel also controlled by said tension arm, the pressure of said regulating brake being gradually reduced by the advance of the arm under the pull of the wire.

6. In a magnet winding machine, the combination with spool-rotating mechanism, of a guide for applying the wire to the spool, a carriage for said guide adapted to be moved to and fro, a feed screw and nut for said moving carriage, said feed nut being arranged to have a definite lost motion with respect to said feed screw upon reversal of its relative rotation, and a device adapted to prevent such lost motion during the winding of the initial layer.

7. In a magnet winding machine, the combination with spool-rotating mechanism, of a guide for applying the wire to the spool, a carriage for said guide adapted to be moved to and fro, a feed screw and nut for said moving carriage, said feed nut being arranged to have a definite lost motion with respect to said feed screw upon reversal of its relative rotation, a shim $p$ adapted to engage the feed nut to prevent said lost motion, and mechanism actuated after the winding of the initial layer for withdrawing said shim from engagement with the feed nut.

8. In a magnet winding machine, the combination with spool-rotating mechanism, of a guide for applying the wire to the spool, a movable arm carrying said guide arranged to press the same against the spool, said guide being raised as each succeeding layer of wire is wound, a cam $e$ acting upon said arm, and means for advancing the cam as the arm is raised to prevent retrogression of the guide, said cam being provided with a shoulder $e^6$ which is engaged by the arm in its extreme depressed position to prevent the advance of the cam, whereby the retrogression of the guide is permitted during the winding of the initial layers.

In witness whereof, I hereunto subscribe my name this 9th day of March A. D., 1903.

FREDERICK H. LOVERIDGE.

Witnesses:
De Witt C. Tanner,
Edwin H. Smythe.